United States Patent [19]

Morris

[11] Patent Number: 4,959,990
[45] Date of Patent: Oct. 2, 1990

[54] COMBINED MASS FLOW/PITOT TUBE METER

[76] Inventor: Robert H. Morris, P.O. Box 563, Mount Freedom, N.J. 07970

[21] Appl. No.: 335,225

[22] Filed: Apr. 10, 1989

[51] Int. Cl.$^5$ .......................... G01F 1/68; G01F 5/00
[52] U.S. Cl. ........................................ 73/202; 73/3; 73/195; 73/198; 73/204.18
[58] Field of Search ................. 73/195, 196, 198, 202, 73/202.5, 203, 3, 204.22, 204.21, 861.65, 861.95, 204.18

[56] References Cited

U.S. PATENT DOCUMENTS

| | | | |
|---|---|---|---|
| 1,122,967 | 12/1914 | Mass | 73/198 |
| 2,060,848 | 11/1936 | Boyle | 73/202 |
| 2,591,195 | 4/1936 | Picciano | 73/202.5 |
| 3,314,290 | 4/1967 | Peranio | 73/202 |
| 3,352,155 | 11/1967 | Penet | 73/198 |
| 3,380,298 | 4/1968 | Hanson | 73/861.65 |
| 3,559,482 | 2/1971 | Baker et al. | 73/202 |
| 3,803,921 | 4/1974 | Dieterich | 73/202 |
| 4,440,021 | 4/1984 | Abouchar et al. | 73/204.22 |
| 4,487,062 | 12/1984 | Olin et al. | 73/202 |
| 4,559,835 | 12/1985 | DeBaun | 73/861.66 |
| 4,562,731 | 1/1986 | Nishimura et al. | 73/202.5 |
| 4,648,270 | 3/1987 | Johnson et al. | 73/202 |

Primary Examiner—Herbert Goldstein
Attorney, Agent, or Firm—Bean, Kauffman & Spencer

[57] ABSTRACT

A mass flow meter probe having an upstream tube and a downstream tube that extends into a main gas flow conduit is disclosed. The sensor for the mass flow measurement is located in the bore of a housing connecting the tubes and by incorporating the sensor into a valve that can block flow between the tubes, the mass flow meter can be calibrated in the field. The probe can be used as differential pressure device for flow measurments, when the valve is closed. A means for cleaning pressure ports is also disclosed.

9 Claims, 2 Drawing Sheets

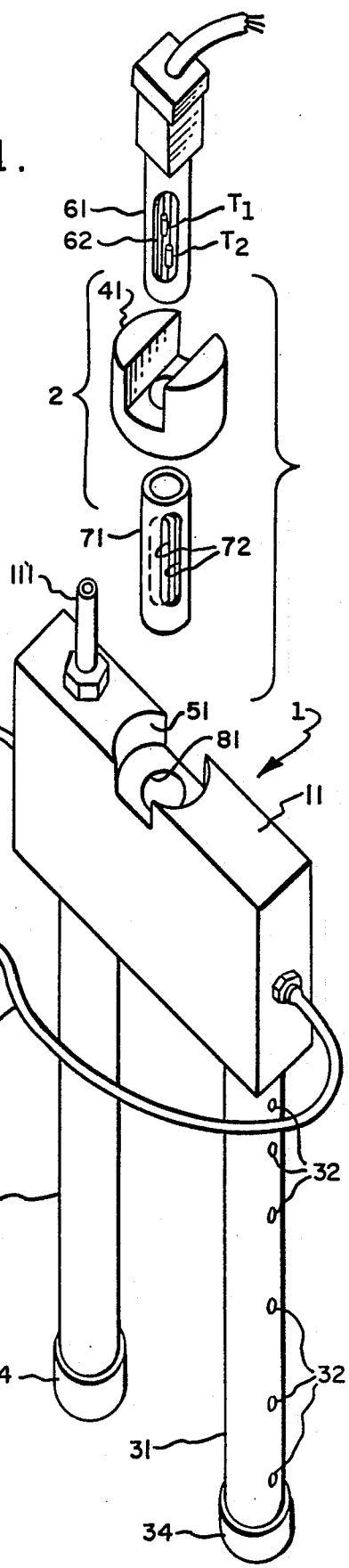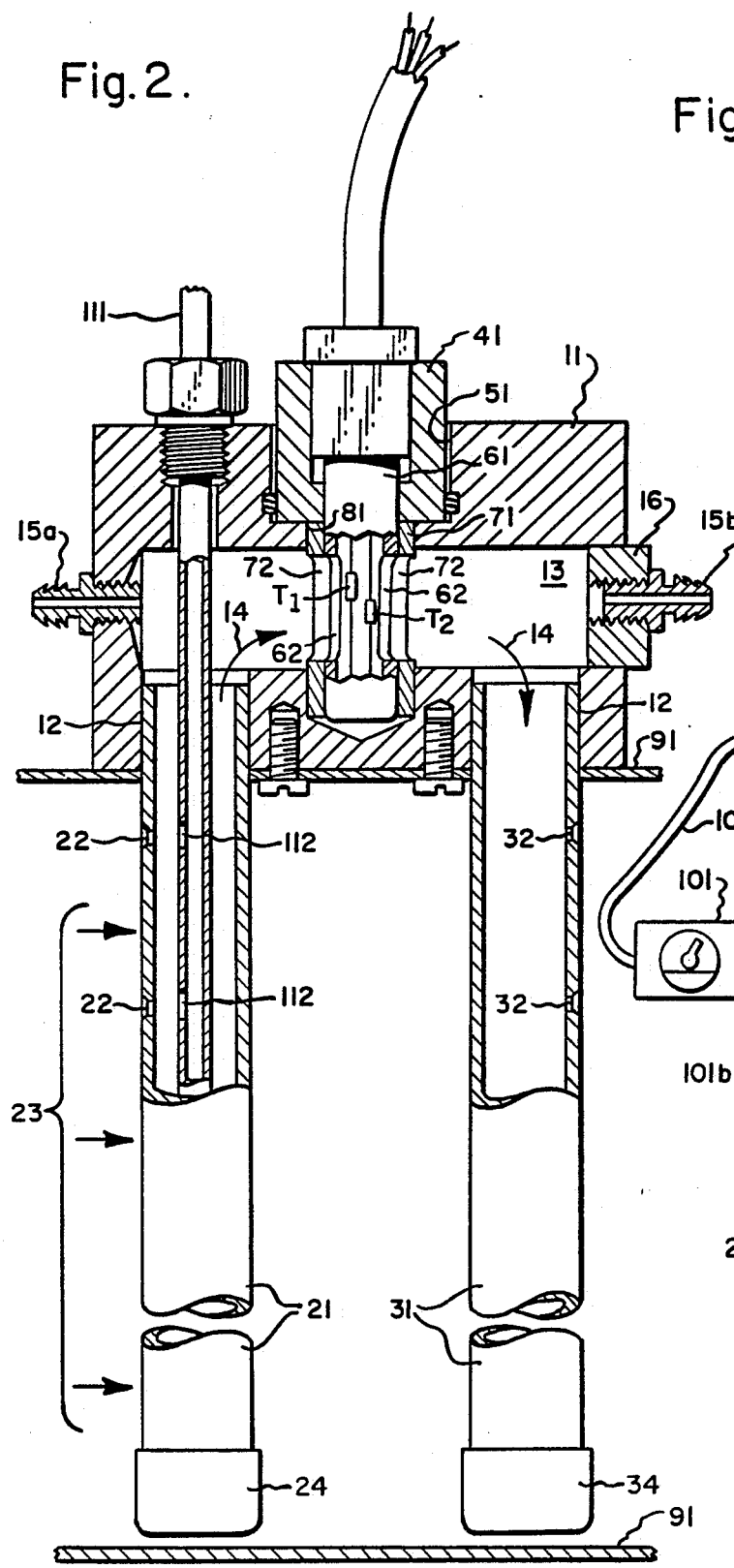

COMBINED MASS FLOW/PITOT TUBE METER

BACKGROUND OF THE INVENTION

The principal object of the present invention is to provide a self-averaging transverse probe which can be easily installed in duct stacks for measuring gas flow in both clean and contaminated mediums, with high resolution, high accuracy and requiring little straight run or flow preconditioning.

There have been attempts to measure bulk air flow by using multiple mass air flow sensors directly within the air stream. The drawbacks of prior systems include sensors that are easily contaminated by the measured medium and must be cleaned on a regular basis by either removing the flow device, or physically entering the duct and cleaning the individual sensors. Critical placement of the mass sensors by an appropriate equal average weighted sensing pattern is frequently difficult, since the thermal sensors cannot always be placed close together due to size constraints. Compromises must then be made that affect the number of sensors which may be used and the ability to position each of them in a proper location. Likewise, since thermal mass measurement can only detect a change of air flow, calibration for the actual amount of air passing through the conduit must be obtained by measuring the air flow by some other method. The most common method in large conduits is a pivot tube. A further disadvantage is that another air flow device is required by the prior art systems as a calibration device. These problems are disadvantages of using mass air flow measurement technology However, the benefits of greater air flow resolution, accuracy and the elimination obtained by pre-flow conditioning (straight run) still makes this technology of continued interest, if some of these disadvantages can be eliminated.

U.S. Pat. No. 4,487,062, issued Dec. 11, 1984 relates to a mass flow meter having a primary passage for fluid whose flow rate is to be measured and a sensor tube which is parallel to the primary passage. Resistance wire coils surrounding the sensor tube and connected to a bridge circuit provide a resistance differential between the wire coils that is proportional to the fluid flow rate. Replaceable plugs permit cleaning of the sensor tube. However, the patent has no teaching of a valve for calibration purposes; pickup and discharge tubes which are used to provide a proportional flow to the sensor and are transverse to the primary flow passage or any means to clean portions of the meter which may become clogged without disassembly or entrance into the conduit.

U.S. Pat. No. 4,559,835, issued Dec. 24, 1985 discloses a transverse probe of a design particularly adapted to measure the flow of air or other gas in a conduit. The probe is of a specific design which permits both the pressure (inlet) and vacuum (outlet) elements to be incorporated in a unitary elongated construction. The patent contains no disclosure of any sensor description or construction.

U.S. Pat. No. 4,648,270, issued Mar. 10, 1987 discloses a mass flow meter having a bypass channel and a detector channel. Thermistors are used in the detector channel to sense the flow being measured The signal is produced by a differential amplifier connected to the two thermistors, and a linearization circuit is also disclosed. There is no disclosure of a mass flow meter having transverse probes, or a valve permitting calibration and/or alternative pressure differential measurement of flow rate in a conduit. Furthermore, there is no teaching of a means to clear pickup ports or the like, and it is particularly to be noted that metal screens or porous discs such as those taught to provide a flow restriction in the main conduit could only be cleaned by entering the main conduit or removing the entire metering assembly, thus shutting down the main conduit.

SUMMARY OF THE INVENTION

The present invention contemplates a mass air flow sensor connecting two tubes extending transversely in a gas flow conduit. The transverse tubes induce a gas flow past the mass gas flow sensor exactly proportional to the gas flow passing through the conduit regardless of upstream turbulence. Within the upstream tube, positive pressure proportional to the gas velocity in the conduit is produced by spaced sensing holes facing upstream and a vacuum proportional to the gas velocity in the conduit is produced by spaced holes facing downstream in the downstream tube. The proportional gas flow induced in the tubes is measured by an ambient temperature electronic thermal mass transducer. The sensor unit also acts as a valve providing flow measurement both by pivot tube and mass flow as well as a means to calibrate the mass flow sensor using a differential pressure meter, while the unit is installed in a conduit.

BRIEF DESCRIPTION OF THE DRAWINGS

The nature and mode of operation of the present invention will now be more fully described in the following detailed description taken with the accompanying drawings wherein:

FIG. 1 is a perspective, exploded view of the preferred form of the sensor unit and probe unit according to the present invention;

FIG. 2 is a view according to the preferred embodiment of the invention, partly in section, illustrated mounted on a section of conduit.

DETAILED DESCRIPTION OF THE PREFERRED EMBODIMENT

Figure 3:
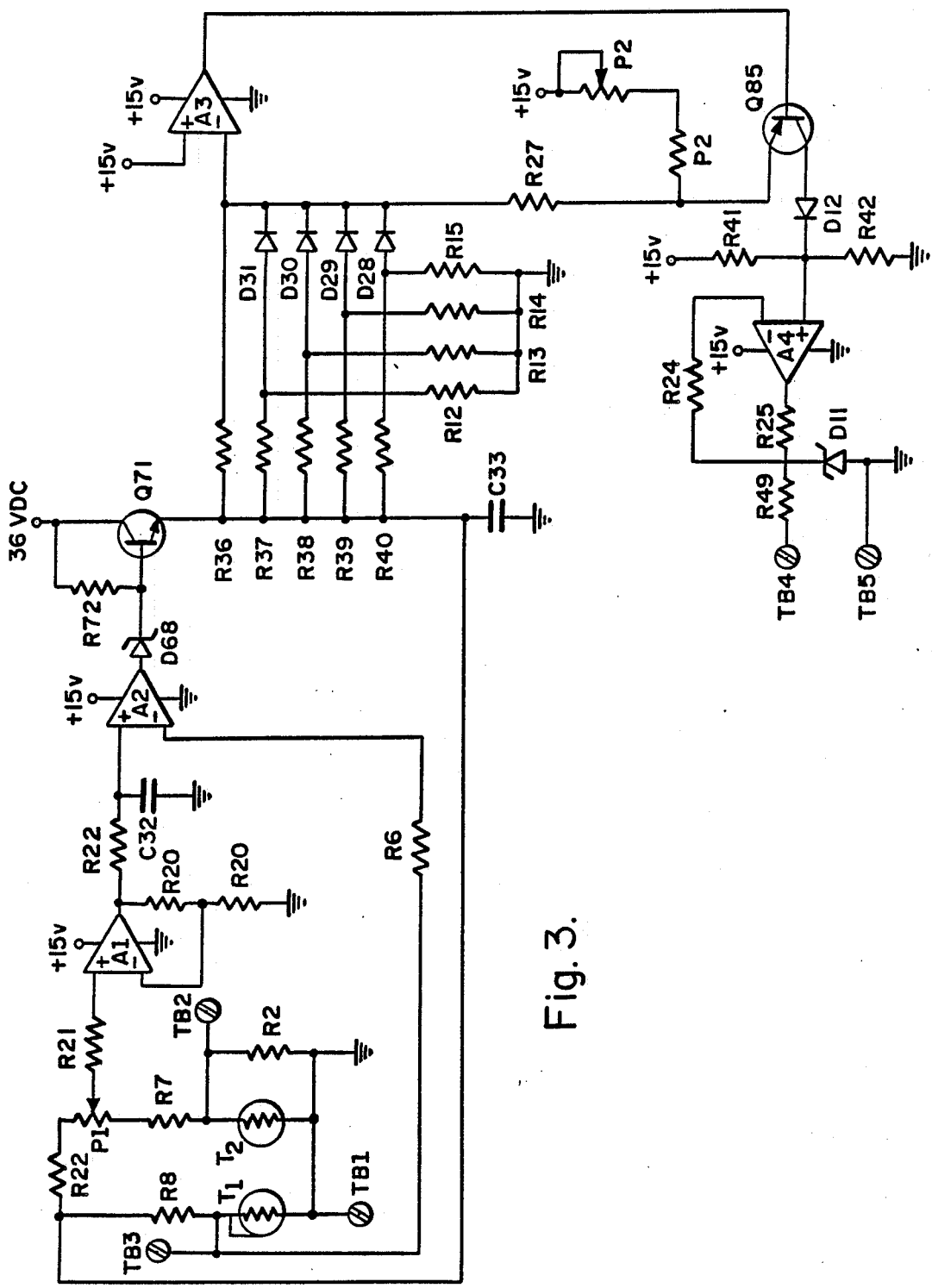
FIG. 3 is a schematic diagram of a circuit for linearizing the output of the sensor.

Referring now to FIGS. 1 and 2, the probe unit indicated generally by 1, has a body 11 with a pair of spaced parallel tubes 21 and 31 extending therefrom and a sensor unit 2 adapted to have its mounting 41 positioned in recess 51 with the sensor 61 and protective sleeve 71 extending into hole 81 of body 11. Each of tubes 21 and 31 has a plurality of sensing holes or pressure ports 22 and 32, respectively, having a size, shape and spacing well known to those skilled in the art of average air flow sampling. The direction of the gas flowing through conduit 91 is shown by arrows 23. Holes 22 are located on the upstream face of upstream tube 21 and holes 32 are on the downstream face of the downstream tube 31 with respect to the conduit gas flow.

Body 11 has a pair of parallel, spaced openings 12 each adapted to receive and retain a respective one of tubes 21 and 31 with the open ends of each of respective tubes 21 and 31 being in communication with bore 13. Bore 13 acts as a tube-like connection between the open end of tube 21 and the open end of tube 31 and provides a path as indicated by arrows 14 for gas to pass through metering slots 62 and 72, when the passage formed by slots 62 and 72 is parallel to the axis of bore 13. Protective sleeve 71 blocks the passage of gas through bore 13 when sensor unit 2 is rotated 90 degrees to position slots 62 and 72 transverse to the axis of bore 13.

Connectors 15a and 15b are provided to permit use of a differential pressure meter 101 connected by tubes 101a and 101b for calibrating the instrument as will be described later.

One end of bore 13 has a removable plug 16 in which connector 15b is mounted in order to facilitate cleaning of bore 13. Also, a tube 111 passing through body 11 and bore 13 extends through the center of upstream tube 21. Tube 111 has a plurality of holes 112 aligned with holes 22 for dislodging any debris which may clog holes 22, if the gas passing through conduit 91 is contaminated with particles. The tube cleaning process is accomplished by applying a high pressure gas such as air to tube 111, which in turn provides a high velocity discharge through holes 112 to effect an in situ cleaning of upstream holes 22 without either removing probe 1 or physically entering the conduit.

Sensor 61 is formed by plastic embedding the leads of a matched pair of positive temperature coefficient thermistors T1 and T2, with the thermistor bodies being located in an elongated slot 62, which slot corresponds to and is aligned with elongated slots 72 in protective sleeve 71. Resistance to flow through the probe should be small ($\leq 0.000038$ Å P) while at the same time the velocity through slot 62 at thermistors T1 and T2 should be in the order of 10% to 40% and preferably 20% to 25% of actual duct velocity to obtain accurate readings. As noted hereinabove, sensor 61 and protective sleeve 71 are rotatable to operate as a valve to stop gas from flowing through bore 13. This valve action provides the advantage that a single probe unit can be alternatively used for pitot tube flow measurements useful at high flow velocities or calibration and adjustment of the mass flow system when closed, or mass gas flow measurement useful at lower gas flow velocities when the valve is open.

Referring now to FIG. 3, the preferred circuit comprises two principal sections. The first section includes the balanced bridge circuitry of thermistors T1 and T2 and associated signal amplification through amplifiers A1 and A2 to transistor Q71. Each thermistor is surrounded by an identical metal jacket, although the jacket of thermistor T1 is heat-sinked to its lead. The feedback to the bridge circuit of thermistors T1 and T2 from the emitter of Q71 is used to rebalance the bridge of thermistors T1 and T2 after they are disturbed by either an increase or decrease in a gas flow thereby. The output current of Q71 is thus proportional to the bridge current of thermistors T1 and T2 which is continually adjusted by Q71 to maintain a balanced state. It will be apparent to those skilled in the art that as the air flow past tubes 21 and 31 of mass air flow sampling probe 1 varies, the air flow through bore 13 going past thermistors T1 and T2 will change proportionally drawing heat from thermistor T1 more rapidly with an increase or less rapidly with a decrease in the flow velocity. This causes an unbalancing which increases the voltage of the output of amplifier A2, which increases the bridge current via Q71 until re-balancing of the bridge is obtained. The second section comprises the linearization circuitry of resistors R36-R40, R12-R15 and diodes D28-D31, amplifiers A3 and A4 and transistor Q85 to provide the signal across output terminals TB4 and TB5. Each diode-resistor section acts to adjust the gain of amplifier A3 in order to linearize the output from Q71.

The mass flow meter is field calibrated by interrupting flow through bore 13 by turning sensor 61 to the off position. Potentiometer PI is then adjusted to provide a minimum signal across output terminals TB4 and TB5 to compensate for ambient temperature and individual bridge component variations. Differential pressure meter 101 is used to provide verification of proper calibration and as a standard adjustment to the individual system. After calibration, the system is adjusted by potentiometer P2 to provide an output consistent with the pitot tube reading. Preferably, the calibration and adjustment are performed at higher conduit velocity, where pitot tube measurements are known to be more accurate.

It is contemplated that the invention is not limited to the use of a single pair of tubes 21 and 31, since the flow paths defined by such tubes may be incorporated in a divided or internally partitioned single tube or each of such tubes may be replaced by multiple tubes connected to body 11 by common manifolds, as shown for instance in U.S. Pat. No. 4,559,835 as being common practice.

What is claimed is:

1. In a mass flow meter having a bypass channel, the improvement comprising the combination of a rotary valve mounted for rotation about an axis extending transverse to said channel and having an elongated slot extending therethrough, said valve permitting fluid to flow through said channel when said valve is rotated to a first position with said slot within said channel and blocking the flow of fluid through said channel when said valve is rotated to a second position with said slot located outside said channel, and mass flow sensing means positioned in said slot to monitor fluid flow through said channel when said valve is in said first position.

2. The improvement according to claim 1 further including a differential pressure meter, said meter being in operative connection with said channel on each side of said valve and adapted to provide a pitot tube flow measurement when said valve is in said second position.

3. The gas flow probe according to claim 2 wherein the velocity of gas at said sensor is in the order of 10% to 40% of actual conduit velocity.

4. The gas flow probe according to claim 2 wherein the velocity of gas at said sensor is in the order of 20% to 25% of actual conduit velocity.

5. A gas flow measuring probe for measuring flow of a gas passing within a conduit comprising:
first tube means disposed to extend transversely with respect to the direction of flow of gas within said conduit and having a first series of pressure ports spaced apart along said first tube means and opening outwardly thereof in substantial alignment with said direction of flow and in a direction upstream thereof;
a second tube means disposed to extend transversely with respect to said direction of flow and having a second series of pressure ports spaced apart along said second tube means and opening outwardly thereof in substantial alignment with said direction of flow and in a direction downstream thereof;
a manifold formed with a bore having first and second ends, first and second passageways in said bore, each of said passageways being connected in flow communication with a respective one of said first and second tube means, said manifold having a mounting opening extending transversely into said bore between said first and second passageways; and a mass flow sensor, said sensor including means rotatable within said mounting opening for blocking flow communication between said first and second passageways and said probe additionally includes a gas pressure differential measuring device disposed for flow communication with said first and second tube means via pressure ports connected one into each of said first and second ends of said bore.

6. A gas flow measuring probe according to claim 5, wherein said probe additionally includes a purge tube mounted by said manifold to extend transversely through said bore and lengthwise within said first tube means, said purge tube having high pressure gas discharge ports spaced apart lengthwise thereof, each discharge port being in essential alignment with one of said first series of pressure ports for directing high pressure purging gas towards said first ports and outwardly therethrough.

7. The gas flow probe according to claim 5 wherein the velocity of gas at said sensor is in the order to 10% to 40% of actual conduit velocity.

8. The gas flow probe according to claim 5 wherein the velocity of gas at said sensor is in the order of 20% to 25% of actual conduit velocity.

9. A gas flow measuring probe for measuring flow of a gas passing within a conduit comprising:

first tube means disposed to extend transversely with respect to the direction of flow of gas within said conduit and having a first series of pressure ports spaced apart along said first tube means and opening outwardly thereof in substantial alignment with said direction of flow and in a direction upstream thereof;

a second tube means disposed to extend transversely with respect to said direction of flow and having a second series of pressure ports spaced apart along said second tube means and opening outwardly thereof in substantial alignment with said direction of flow and in a direction downstream thereof;

a third tube mean for placing said first and second tube means in flow communication, a purge tube disposed to extend transversely of said third tube means and lengthwise of said first tube means, said purge tube having high pressure gas discharge ports spaced apart lengthwise thereof and aligned with said first series of pressure ports for directing high pressure purging gas outwardly therethrough; and a mass flow sensor disposed within said third tube means.

* * * * *

UNITED STATES PATENT AND TRADEMARK OFFICE
CERTIFICATE OF CORRECTION

PATENT NO. : 4,959,990
DATED : 10/2/90
INVENTOR(S) : Robert H. Morris

It is certified that error appears in the above-identified patent and that said Letters Patent is hereby corrected as shown below:

Abstract, line 2 - "extends" should be --extend--.

Abstract, line 8 - after "as", insert --a--.

Col. 1, line 29 - "pivot" should be --pitot--.

Col. 2, line 26 - "pivot" should be --pitot--.

Col. 5, line 23 - "to" should be --of--.

Signed and Sealed this

Eighth Day of June, 1993

Attest:

MICHAEL K. KIRK

Attesting Officer

Acting Commissioner of Patents and Trademarks